United States Patent Office 3,605,202
Patented Sept. 20, 1971

3,605,202
SYSTEM FOR FIXING CABLES AND RODS SUBJECTED TO STRESS
Ricardo Barredo de Valenzuela, Raimundo Fernandez, Villaverde 45, Madrid 3, Spain
Filed Dec. 11, 1968, Ser. No. 783,077
Int. Cl. F16g 11/00
U.S. Cl. 24—122.6    4 Claims

ABSTRACT OF THE DISCLOSURE

A system for fixing tension members, such as cables and rods, to an anchor device, especially useful for supporting load-bearing tension members which are to be stressed by what is known as a post-stressing process. The basic components of the anchor device are an external crown and an internal crown, both being formed of a hard metal, hard enough to resist a plastic deformation. The two basic components cooperate to form a wedge to clamp the several tension members. A clamping action of the tension members is accomplished by the wedge action between the internal crown and the external crown. The internal crown is formed with a multiplicity of half-round channels to receive the various members which are to be fixed. In the bottom of the channels, grooves are formed in an axial direction in order to allow the internal crown to deflect under the pressure of stressing of the elements, thus imparting some elasticity to the internal crown, whereby, by the effect of the pressure of the wedging action, the channels conform to the lateral surface of the members to be fixed, bringing about an intimate contact. To avoid any undue distortion, due to the elasticity of the internal crown, a distortion limiting ring is inserted in the interior of the crown. In an alternate embodiment, the internal crown is uniformly thick in the axial direction of the tension members, the distortion limiting ring having its outer surface in the form of a cone section.

SUMMARY OF THE INVENTION

The fixing of tension members which constitute the reinforcement of post-stressed load-bearing elements, in the past, has presented serious problems because of the enormous tensile stresses that are encountered. The problems become even more acute when the reinforcement consists of a plurality of tension members grouped together.

Efforts have been made in the art to satisfactorily resolve the problem of fixing the tension members by means of the employment of wedges formed of a material of relatively high plasticity so that, by the effect of the pressure created by the wedging action, the material of the wedges incurs a plastic deformation and conforms to the lateral surface of the members to be fixed, bringing about an intimate contact between the members and the anchoring wedge.

Such known deformable anchoring means have given satisfactory results in a limited number of specific applications, namely when the stresses on the tension members are not very great and when the number of members to be fixed is small. When such prior anchoring devices are utilized for the fixation of a large plurality of tension members, the tensional stresses may be so great as to cause minute, but continuous, deformation of the plastic material of the wedge. Thus, over a period of time, the tension members experience longitudinal slippage through the anchoring device, causing a reduction in the tensional stress capabilities of the tension members, or, eventually, total destruction of the anchoring device.

The object of the present invention is to provide an anchoring device which will accommodate a plurality of tension members under high tension with minimum risk of slippage of the members or destruction of the anchoring device.

A further object of the invention is to provide an anchoring device formed of hard material, which material resists deformation within the range of pressures exerted against the anchoring device by the tension members.

An additional object of the invention is to provide an anchoring device, wherein the material of the anchoring device is hard enough to resist a plastic deformation but which is effective to impart some elasticity to portions of the anchoring device, permitting intimate contact between the anchoring device and the tension members.

Another object of the invention is to provide an anchoring device of the type described above, wherein the distortion of the elastic element of the anchoring device is limited.

The invention consists of a system for fixing tension members, such as cables and rods, to an anchor device, especially useful for supporting load-bearing tension members which are to be stressed by what is known as a post-stressing process. The baic component of the anchor device are an external crown and an internal crown, both being formed of a hard metal, hard enough to resist a plastic deformation. The two basic components cooperate to form a wedge to clamp the several tension members. A clamping action of the tension members is accomplished by the wedge action between the internal crown and the external crown. The internal crown is formed with a multiplicity of half-round channels to receive the various members which are to be fixed. In the bottom of the channel, grooves are formed in an axial direction in order to allow the internal crown to deflect under the pressure of stressing of the elements, thus imparting some elasticity to the internal crown, whereby, by the effect of the pressure of the wedging action, the channels conform to the lateral surface of the members to be fixed, bringing about an intimate contact. To avoid any undue distortion, due to the elasticity of the internal crown, a distortion limiting ring is inserted in the interior of the crown. In an alternate embodiment, the internal crown is uniformly thick in the axial direction of the tension members, the distortion limiting ring having its outer surface in the form of a cone section.

By means of such system of anchoring tension members, there is obtained, in the first instance, an elasticity characteristic of the device sufficient to facilitate compression of the tension members throughout the length of the members withint he anchoring device, and in the second instance, a degree of hardness of material sufficient to prevent deformation of the anchoring device over an extended period of time.

BRIEF DESCRIPTION OF THE DRAWINGS

In order to enable the invention to be more easily understood, in the accompanying drawings, there is represented preferred embodiments of the anchoring device, particularly intended for industrial use, such embodiments being included merely by way of information and consequently not representing any limitations of the invention.

In the accompanying drawings.

DETAILED DESCRIPTION OF THE INVENTION

Figure 1:
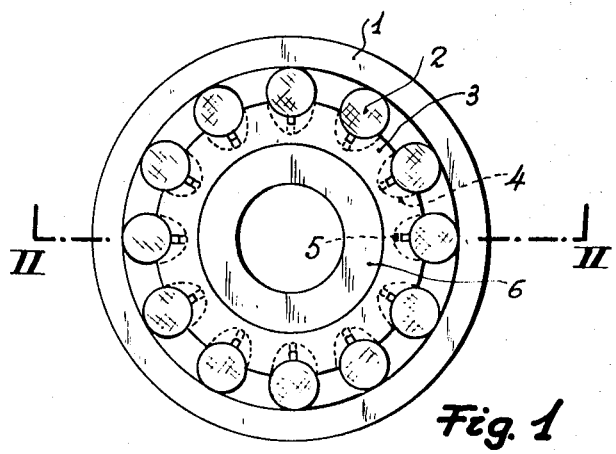
FIG. 1 shows a front view of the anchoring device in accordance with one embodiment of the invention.
Figure 2:
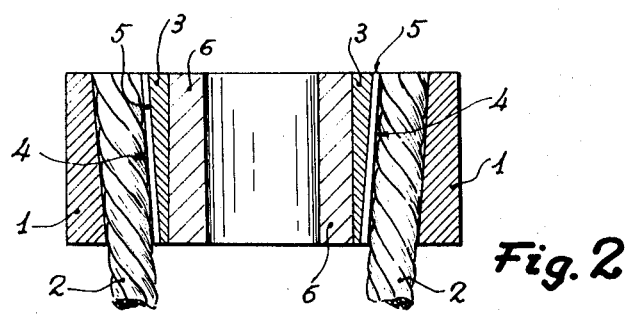
FIG. 2 shows a section taken along section line II—II of the same device as shown in FIG. 1.

As shown in FIGS. 1 and 2, the anchoring device includes an external crown 1, whose interior surface is conical and whose external surface is cylindrical. The external crown 1 embraces a plurality of tension members 2 which are supported against the interior conical surface. The tension members are compressed against the interior conical surface by means of a wedging action between the external crown 1 and an internal crown 3. The internal crown 3 is provided with a series of longitudinal channels 4 of dimensions corresponding to the dimensions of the tension members intended to be retained in the channel. In this connection, it will be appreciated that a different internal crown 3 can be selected for different quantities and/or sizes of tension members to be anchored, thus optimizing the capacity of the anchoring device for a particular application.

As best viewed in FIG. 2, it will be noted that the cylindrically shaped channels 4 are inclined at a slight angle with respect to the axis of the internal crown 3 and external crown 1, each of the channels 4 having a longitudinal groove 5 extending the length of the channel, which serves to reduce the thickness of the internal crown 3 between the bottom of the channels 4 and the interior surface of internal crown 3. The reduction in thickness of the internal crown 3 provides a localized area of diminished material strength, such that, as internal crown 3 is moved downwardly (as viewed in FIG. 2), the compression forces against the channels 4 are effective to deform portions of the internal crown 3 directly adjacent the grooves 5, thus imparting some elasticity to the internal crown 3, whereby, by the effect of the pressure of the wedging action, the channels 4 conform to the lateral surface of the tension members 2, bringing about the desired intimate contact. Thus, each of the individual sections of the internal crown 3, lying between tension members 2, is relatively free to move about, conforming the internal crown sections between tension members as closely as possible with the shape of the members 2.

Both the external crown 1 and the internal crown 3 are preferably made of a hard metal in order to minimize the plastic deformation of the anchor crowns. By the elastic action of the internal crown 3 at the areas of reduced thickness, the advantages of using a hard metal for greater strength and permanence of installation and achieving the ability of the separate parts of the anchor conforming precisely to the particular tension members used are realized simultaneously.

Under extreme tensional stresses by the combined plurality of tension members, it might be possible to deform the internal crown 3 beyond the limit which constitutes optimum wedging action against the external crown 1. In applications requiring extreme tensional stresses, the deformation imparted to the internal crown 3 can be limited by inserting a tubular distortion limiting ring 6 within the anchoring device whose outer diameter is determined by the internal diameter of internal crown 3 and the amount of elasticity of internal crown 3 desired for the particular application involved. The larger the diameter of tubular ring 6, the smaller the amount of deformation of internal crown 3 which will result.

Figure 3:
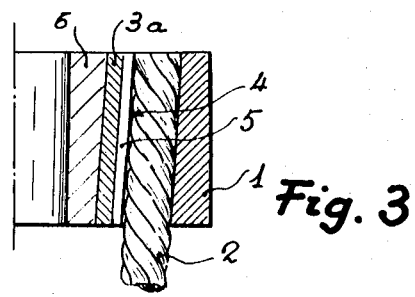
FIG. 3 shows an alternate embodiment of the invention.

Tubular ring 6 may be of cylindrical shape, as shown in FIG. 2 or of conical shape, as shown in FIG. 3. In the embodiment of FIG. 2, the channels 4 are inclined to the cylindrical interior surface of internal crown 3, thus requiring a cylindrically shaped tubular ring 6. Alternatively, as shown in FIG. 3, the interior surface of internal crown 3 is conical shaped (as best understood by referring to numeral 3a in FIG. 3) thus requiring a complementary conical shaped external surface of ring 6.

Depending upon the particular application involved, the employment of a suitable internal crown 3 and distortion limiting ring 6 will insure the optimum wedging action, such that all of the tension members to be fixed are evenly compressed.

It is evident that numerous variations of the embodiments of the invention disclosed herein are possible. For example, a suitable anchoring device for certain applications may be void of the longitudinal grooves 5, the depth of channels 4 being sufficient to cause the elastic action of the internal crown. The foregoing description, while defining particular preferred embodiments of the invention, encompasses an anchoring apparatus including an external, generally cylindrical elements, and an internal, generally cylindrical element having channels thereon which embrace a plurality of tension members, which members are subjected to lateral pressure by means of a wedging action between the external and the internal elements. Each of the channels are provided with longitudinal grooves, permitting a predetermined degree of deformation of the internal element, the deformation being limited either by lateral pressure on the tension members or by means of a distortion limiting ring insert.

The nature of the invention being sufficiently described herein and examples of the practical implementation thereof having been given, it is apparent that other embodiments and modifications of the invention may be made without departing from the scope and spirit of the invention as defined in the appended claims.

What is claimed is:

1. An improved anchoring device for fixing tension members subjected to stress comprising:
   an internal compressing crown having a plurality of longitudinal channels arranged on the periphery thereof, said channels being inclined to the axis of said internal crown, each of said channels being adapted to matingly receive one of said tension members, and each of said channels having a longitudinal groove along its bottom which reduces the thickness at predetermined points on said internal crown, thereby permitting controlled localized elastic deformation of portions of said internal crown; and
   an external compressing crown having an interior conical-shaped surface, whereby, upon application of an axial force applied to said internal crown, compression of said tension members by the wedging action between said internal and external crowns causes deformation of portions of said internal crown, thereby forcing said internal crown to intimately contact and retain said tension members in said anchoring device.

2. An improved anchoring device for fixing tension members subjected to stress comprising:
   an internal compression crown having an interior surface, and having a periphery with a plurality of longitudinal channels arranged on said periphery said channels being inclined to the axis of said internal crown and each of said channels being adapted to matingly receive one of said tension members;
   an external compressing crown having an interior conical-shaped surface, whereby, upon application of an axial force applied to said internal crown, compression of said tension members by the wedging action between said internal and external crowns causes deformation of portions of said internal crown, thereby forcing said internal crown to intimately contact and retain said tension members in said anchoring device; and
   an interior cylindrical ring whose exterior surface substantially conforms to said interior surface of said internal compressing crown, thereby counteracting and limiting the deformation of said internal crown.

3. The improvement as defined in claim 2, wherein said interior surface of said internal crown and said exterior surface of said ring are cylindrical.

4. The improvement as defined in claim 2 wherein said interior surface of said internal crown and said exterior surface of said ring are conical.

References Cited

UNITED STATES PATENTS

| | | | |
|---|---|---|---|
| 3,520,032 | 7/1970 | Howlett et al. | 52—230X |
| 2,139,642 | 12/1938 | Osolin | 24—123 UX |
| 2,157,227 | 5/1939 | Brickman et al. | 24—122.6 |
| 2,341,922 | 2/1944 | King et al. | 24—122.6 |
| 2,856,662 | 10/1958 | Clark et al. | 24—122.6 |
| 3,045,305 | 7/1962 | Andersen | 24—122.6 |
| 3,123,879 | 3/1964 | Boduroff et al. | 24—122.6 |

STANLEY N. GILREATH, Primary Examiner

W. H. SCHROEDER, Assistant Examiner

U.S. Cl. X.R.

24—126L; 52—223L